(12) United States Patent
Lee

(10) Patent No.: US 6,774,906 B2
(45) Date of Patent: Aug. 10, 2004

(54) METHOD AND SYSTEM OF IMPROVING SILHOUETTE APPEARANCE IN BUMP MAPPING

(75) Inventor: Ruen-rone Lee, Hsinchu (TW)

(73) Assignee: Silicon Integrated Systems Corp. (TW)

(*) Notice: Subject to any disclaimer, the term of this patent is extended or adjusted under 35 U.S.C. 154(b) by 166 days.

(21) Appl. No.: 10/251,559

(22) Filed: Sep. 19, 2002

(65) Prior Publication Data

US 2003/0227464 A1 Dec. 11, 2003

(51) Int. Cl.[7] .................................................. G09B 5/00
(52) U.S. Cl. ........................................................ 345/584
(58) Field of Search ............................... 345/421, 426, 345/582, 584, 581, 587, 588

(56) References Cited

U.S. PATENT DOCUMENTS

| | | | | |
|---|---|---|---|---|
| 5,880,736 A | * | 3/1999 | Peercy et al. | 345/426 |
| 6,256,038 B1 | * | 7/2001 | Krishnamurthy | 345/582 |
| 6,441,816 B1 | * | 8/2002 | Nguyen et al. | 345/420 |

* cited by examiner

*Primary Examiner*—Matthew Luu
(74) *Attorney, Agent, or Firm*—Martine & Penilla, LLP

(57) ABSTRACT

The invention provides a method of improving silhouette appearance in bump mapping, which not only reduces the operation overhead of applying displacement mapping to a whole model but also retains the truly geometric shape in displaying the object silhouette. The invention comprises the following steps: receiving, checking vertex, checking subdivision, subdividing, repeating, displacing and bump mapping. The invention also discloses a system employing the method of improving silhouette appearance in bump mapping.

20 Claims, 8 Drawing Sheets

$$\vec{N} = (\vec{N}_1 + \vec{N}_2 + \vec{N}_3 + \vec{N}_4 + \vec{N}_5 + \vec{N}_6)/6$$

METHOD AND SYSTEM OF IMPROVING SILHOUETTE APPEARANCE IN BUMP MAPPING

BACKGROUND OF THE INVENTION

1. Field of the Invention

The invention relates generally to a method and system of improving silhouette appearance, applied to a bump mapping technique, thereby rendering a three-dimensional and true object silhouette.

2. Description of the Related Art

Bump mapping roughens surfaces of a object by modifying the normals without displacing surfaces. Although there seems to be many bumps in the surfaces, it is no more than a camouflage.

As shown in FIG. 1(a), there are parallel, upward normals on a smooth surface. In contrast, a rough surface features disorderly directions of surface normals in FIG. 1(b). After bump mapping is applied, a smooth surface whose normal directions should be parallel mimics a rough surface with disorderly surface normals as shown in FIG. 1(c).

In contrast with bump mapping modifying surface normals only, displacement mapping actually varies surfaces; for example, a screw is created from a cylinder.

However, the main problem of bump mapping is that real concaves or convexes does not exist in a model. Thus, silhouette edges that seem to pass through a concave does not produce an expected cross section. In other words, silhouette edges still comply with the original geometry of the module. Silhouette appearance seems like flat, even if the bump mapping technique has been applied to emulate a rugged surface.

SUMMARY OF THE INVENTION

In view of the above-mentioned problems, it is therefore an important object of the invention to provide a method and system of improving silhouette appearance in bump mapping so that the appearance of the bumpy object silhouette approaches the true geometry.

A method of improving silhouette appearance in bump mapping comprises the following steps: receiving, checking vertex, checking subdivision, subdividing, repeating, displacing and bump mapping. In the receiving step, a triangle of a plurality of triangles is received. In the checking vertex step, whether there is a vertex near silhouette in the triangle is checked. In the checking subdivision step whether the triangle meets a predetermined criterion of subdivision is checked, if the result of the checking vertex step is "YES". In the subdividing step, the triangle is subdivided if the result of the checking subdivision step is "YES". In the repeating step, the receiving step the checking vertex step, the checking subdivision step and the subdividing step are repeated until the triangle does not meet the predetermined criterion. In the displacing step, the vertex positions near silhouette along their normals are displaced according to the displacements obtained from displacement mapping if the result of the checking subdivision step is "NO". Finally, in a bump mapping step, the bump mapping technique is implemented if the result of the checking vertex step is "NO".

A system of improving silhouette appearance in bump mapping comprises the following devices. A receiving device receives a triangle of a plurality of triangles. A checking vertex device checks whether there is a vertex near silhouette in the triangle. A checking subdivision device checks whether the triangle meets a predetermined criterion of subdivision if there is a vertex near silhouette in the triangle. A subdividing device subdivides the triangle. A repeating device conducts the receiving device, the checking vertex device, the checking subdivision device and the subdividing device to repeat their own operations until the triangle does not meet the predetermined criterion, and then inputs the triangle into the displacing device. A displacing device of displacing the vertex positions near silhouette along their normals according to the displacements obtained from displacement mapping. And a bump mapping device implements bump mapping if there is no vertex near silhouette in the triangle or after the triangle has been processed by the displacing device.

In addition, there is provided a machine-readable record medium storing programs for instructing an MPU (Microprocessor Unit) etc. to execute the aforementioned method of improving silhouette appearance in bump mapping.

Furthermore, there is provided a system of improving silhouette appearance in bump mapping, comprising a CPU and a memory storing instructions so that the CPU can access instructions stored in the memory and execute the aforementioned method of improving silhouette appearance in bump mapping.

Both bump mapping and displacement mapping can mimic a rugged surface. However, if the surface is not perpendicular to the line of sight, bump mapping has fine visual quality and less mathematic operations, but can not display the closely true geometry of bumps near silhouette. Although the visual quality is quite satisfactory, displacement mapping is limited to use considerable quantity of triangles to mimic the true geometry after the base model has been moved. Thus, in order to combine the advantages of bump mapping and displacement mapping, the invention disclose a method and system: Apply bump mapping to a triangle (surface) near silhouette, or apply displacement mapping to a triangle (surface) not near silhouette. Therefore, the invention not only reduces the operation overhead of applying bump mapping to a whole model, but also retains the true geometry in displaying object silhouette.

DESCRIPTION OF THE PREFERRED EMBODIMENTS

Figure 1A:
FIG. 1(a) is a schematic diagram showing normals of a smooth surface.
Figure 1B:
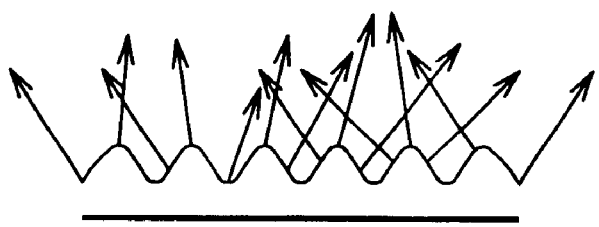
FIG. 1(b) is a schematic diagram showing normals of a rugged surface.
Figure 1C:
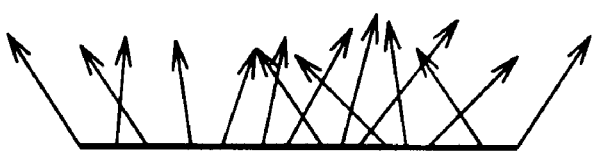
FIG. 1(c) is a schematic diagram showing normals after applying bump mapping.
Figure 2:
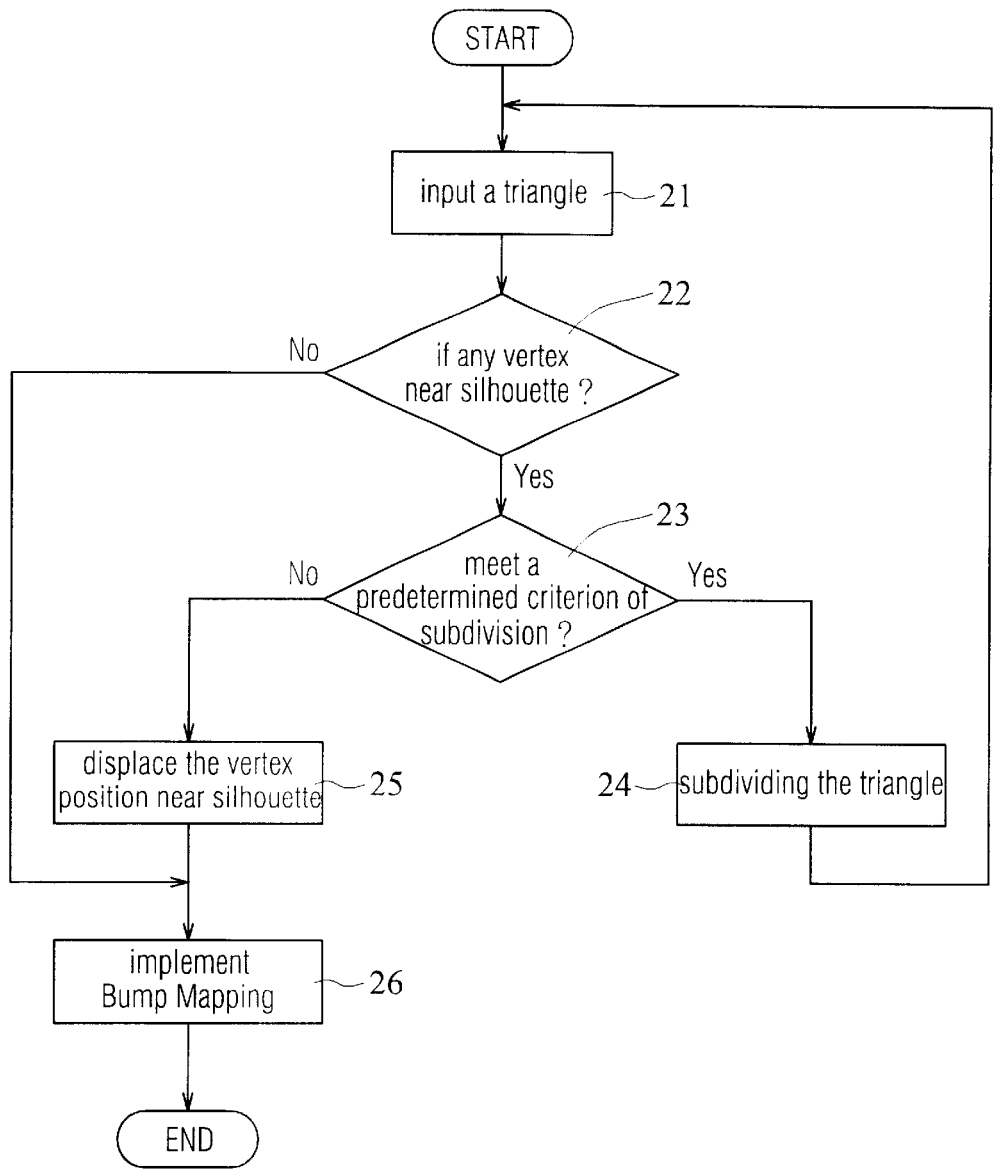
FIG. 2 is a flow chart showing the method of improving silhouette appearance in bump mapping of the invention.

The method of improving silhouette appearance in bump mapping in accordance with the preferred embodiments of the invention will be described with reference to FIG. 2.

First, in step 21, a triangle of a plurality of triangles is received.

Then, in step 22, if there is a vertex near silhouette in the triangle is checked. If the result of this step is "YES", step 23 is performed. If "NO", step 26 is performed.

Figure 3:
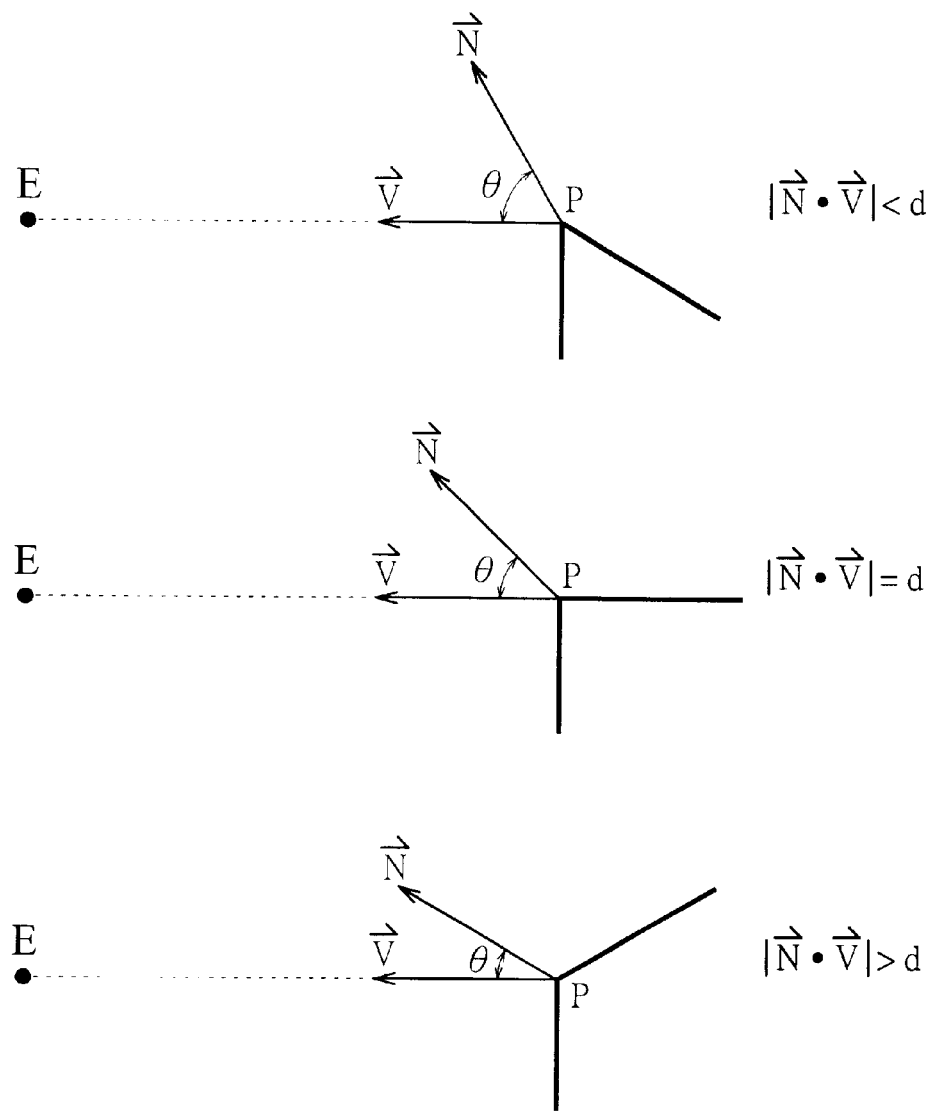
FIG. 3 is a schematic diagram showing the near silhouette criterion.
Figure 4:
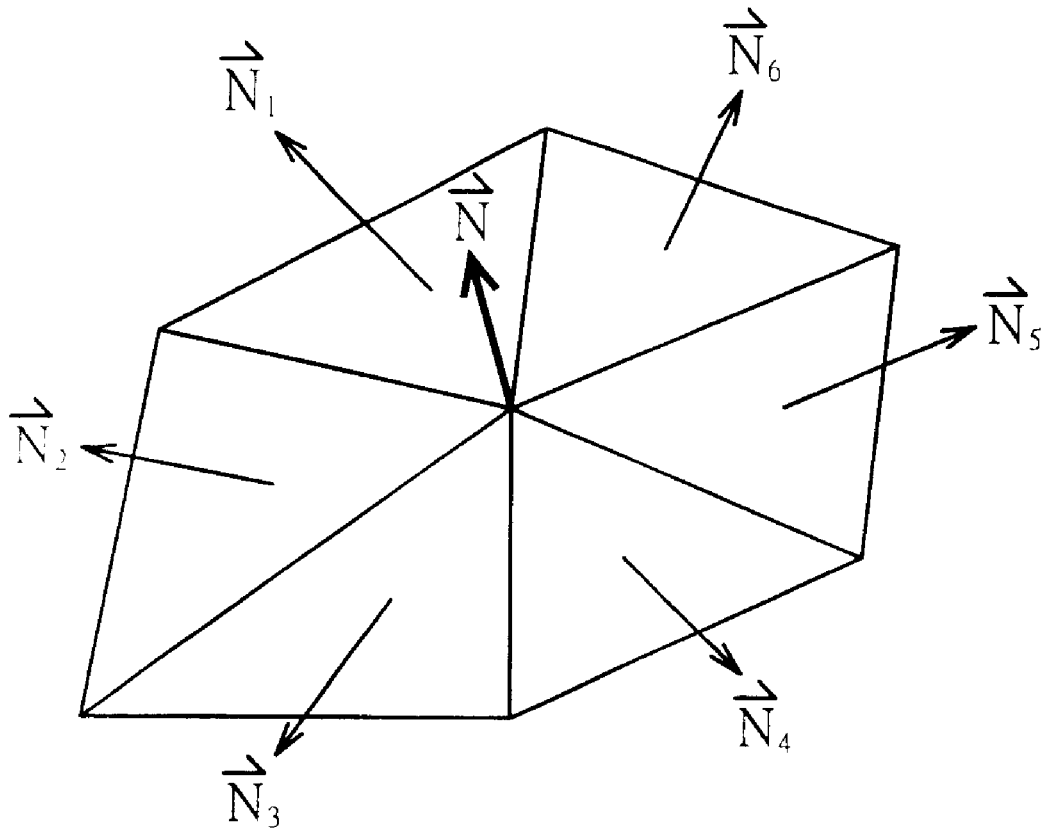
FIG. 4 shows that the vertex normal of a vertex is an average of surface normals of all surfaces adjacent to the vertex.

Referring to FIG. 3, how to check the vertex in step 22 is set forth as follows:

Assume that there are a vertex normal $\vec{N}$, a view vector $\vec{V}$ and a known positive real number d, $0 \leq d \leq 1$, if $0 \leq |\vec{N} \bullet \vec{V}| \leq d$, it is called that the vertex is near silhouette, wherein $\vec{N}$ is derived from averaging all surface normals of all triangles adjacent to the vertex, i.e. $\vec{N} = (\vec{N}_1 + \vec{N}_2 + \ldots + \vec{N}_n)/n$ (In FIG. 4, n=6, for example). The vector from vertex P to eye position E is denoted as $\vec{V}$, i.e. $\vec{V} = \vec{E} - \vec{P}$. Note that $\vec{N}$ and $\vec{V}$ have to be normalized respectively before the dot product is operated. And, the positive real number d is a user-defined constant.

The value of $\vec{N} \bullet \vec{V}$ implies the angle formed between $\vec{N}$ and $\vec{V}$. For example, if $\vec{N} \bullet \vec{V}$ is equal to 0, it means that they are perpendicular to each other; if $\vec{N} \bullet \vec{V}$ is equal to 1, it means that they are parallel to each other. Therefore, the positive number d defines a threshold value, which is the user-defined near silhouette criterion.

In step 23, whether it is necessary to stop subdividing the first triangle is determined. If the result of this step is "YES", step 25 is performed; if "NOT", step 24 is performed.

In step 23, according to the predetermined number of subdivision (for example at most 3 times) or minimum dividable area, whether it is necessary to stop subdividing the first triangle is determined. Alternatively, there is another method that the number of subdivision is derived from the distance between an object and the screen. Accordingly, the further the triangle away from the screen, the less subdivision is derived. In contrast, the nearer the triangle close to the screen, the more subdivision is derived. However, no matter which method, there must be a maximum number of subdivision, or it will be trapped in endless loops.

Figure 5A:
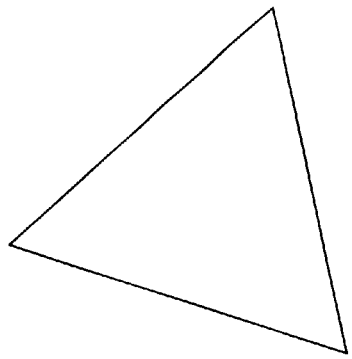
FIGS. 5(a)–5(c) are schematic diagram that shows how to divide a triangle in the invention.
Figure 5B:
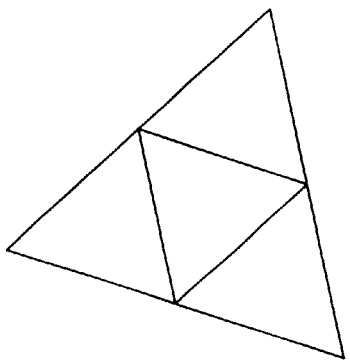
Figure 5C:
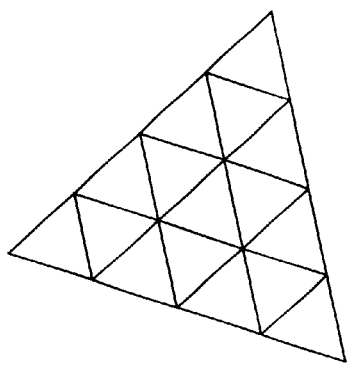

Take the triangle in FIG. 5(*a*) as an example. Calculate three new vertex normals at middle points of three sides of the triangle by using interpolation. Then, four sub-triangles shown in FIG. 5(*b*) are obtained after interconnecting three middle points. If there is another subdivision applied in the next loop, sixteen sub-triangles are finally presented in FIG. 5(*c*). Moreover, as an alternative subdivision method, a triangle is subdivided into 3 sub-triangles by using the center of gravity of the triangle.

Figure 6A:
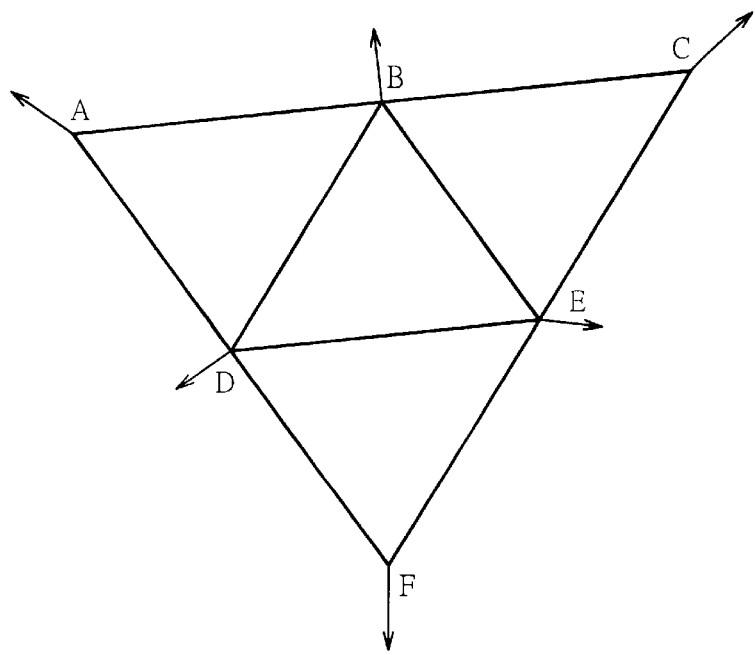
FIGS. 6(a)–6(b) are schematic diagram that shows how to divide a triangle having two vertexes near silhouette.
Figure 6B:
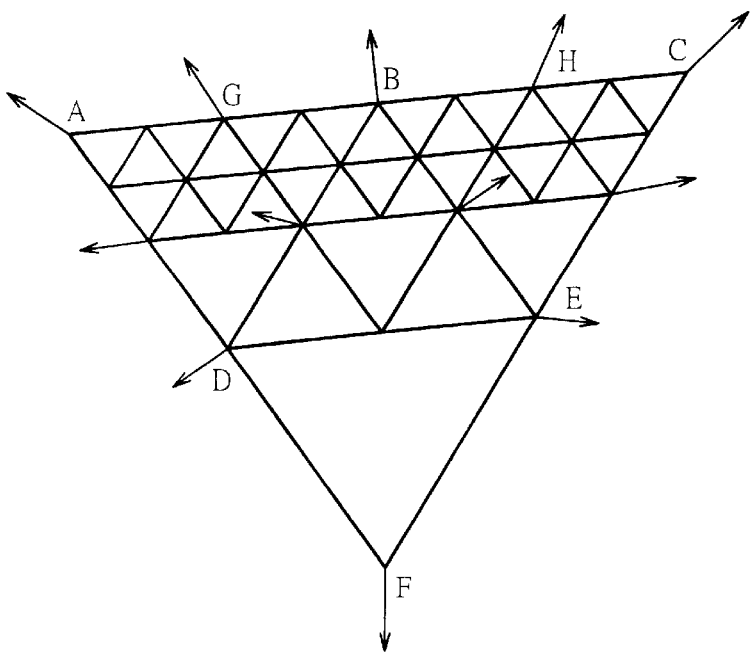
Figure 7A:
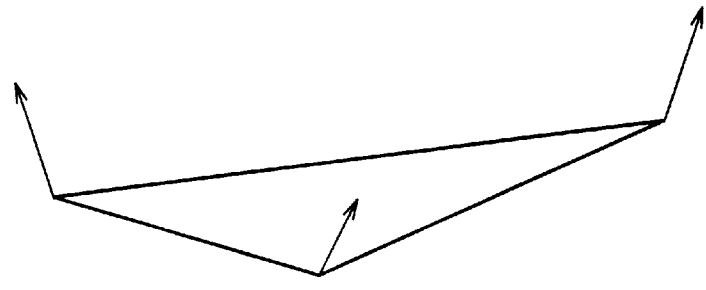
FIGS. 7(a)–7(c) are schematic diagram that applies displacement mapping.
Figure 7B:
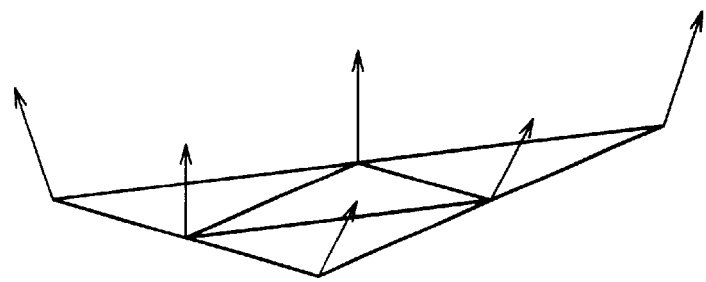
Figure 7C:
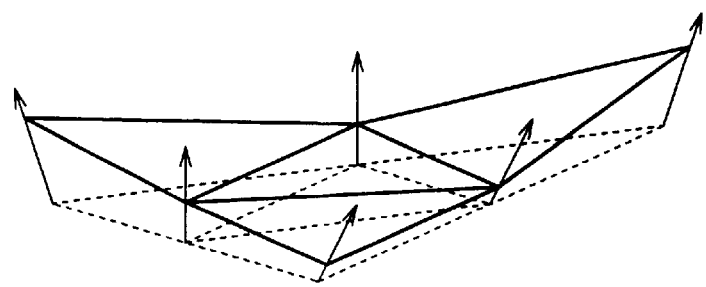
Figure 7D:
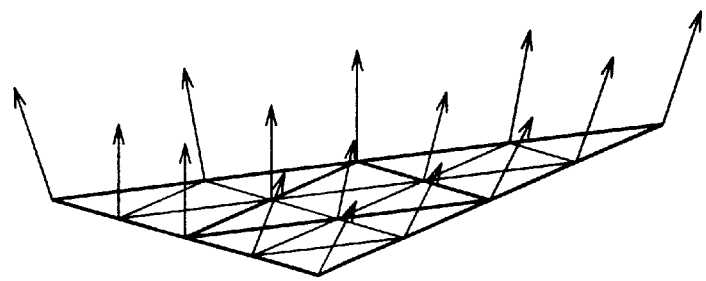
Figure 7E:
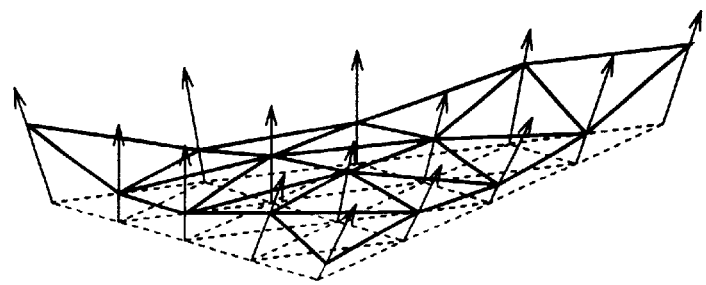

Referring to FIG. 6(*a*), the operations performed in step 21 through step 24 are described in the following. In triangle ACF, $\overline{AC}$ is a silhouette, but $\overline{AF}$ and $\overline{CF}$ are not silhouette. Owing to vertexes A and C near silhouette, triangle ACF is divided into triangle ABD, triangle BCE, triangle DBE and triangle DEF. Also, triangles ABD, BCE and DBE are subdivided again because there is at least one vertex near silhouette in each triangle. Similarly, each of the resultant triangles are subdivided once more as shown in FIG. 6(*b*).

In step 25, vertex positions near silhouette along their normal is displaced. According to the displacements along their vertex normals in displacement mapping, displace vertex positions. An original triangle in FIG. 7(*a*) is divided into four sub-triangles in FIG. 7(*b*) after the first division by using interpolation. After displacement mapping is applied to each vertex, the displacement of each vertex of the triangles is illustrated in FIG. 7(*c*). Through interpolation, 16 sub-triangles in FIG. 7(*d*) are obtained after the second subdivision. Similarly, after displacement mapping is applied to each vertex, the displacement of each vertex of the triangles is illustrated in FIG. 7(*e*).

Finally, in step 26, the bump mapping technique is implemented.

Figure 8:
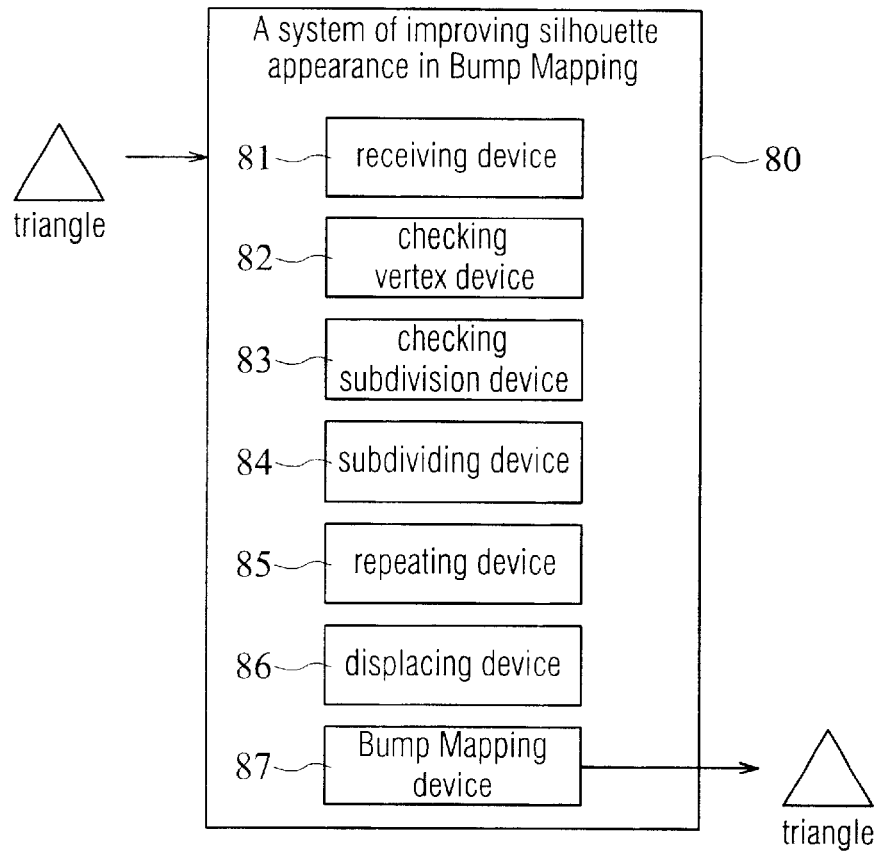
FIG. 8 is an architectural diagram showing the system of improving silhouette appearance in bump mapping.

Besides, referring to FIG. 8, in this embodiment, a system of improving silhouette appearance in bump mapping comprises seven parts: a receiving device 81, a checking vertex device 82, a checking subdivision device 83, a subdividing device 84, a repeating device 85, a displacing device 86 and a bump mapping device 87. The aforementioned seven parts will be described hereafter.

Receiving device 81 receives a first triangle of a plurality of triangles. Checking vertex device 82 checks whether there is a vertex near silhouette in the first triangle. Checking subdivision device 83 checks whether the first triangle meets a predetermined criterion of subdivision, if there is a vertex near silhouette in the first triangle. Subdividing device 84 subdivides the first triangle. Repeating device 85 directs the receiving, the checking vertex, the checking subdivision and the subdividing devices to repeat their own operations until the first triangle does not meet the predetermined criterion, then inputs the first triangle into the displacing device. Displacing device 86 displaces the vertex positions near silhouette along their normals according to the displacements obtained from displacement mapping. Bump mapping device 87 implements bump mapping if there is no vertex near silhouette in the first triangle, or after the first triangle has been processed by the displacing device.

Further, the system of improving silhouette appearance in bump mapping can also be manufactured into hardware chip modules like ASICs for speeding up image processing by one of ordinary skill.

Figure 9:
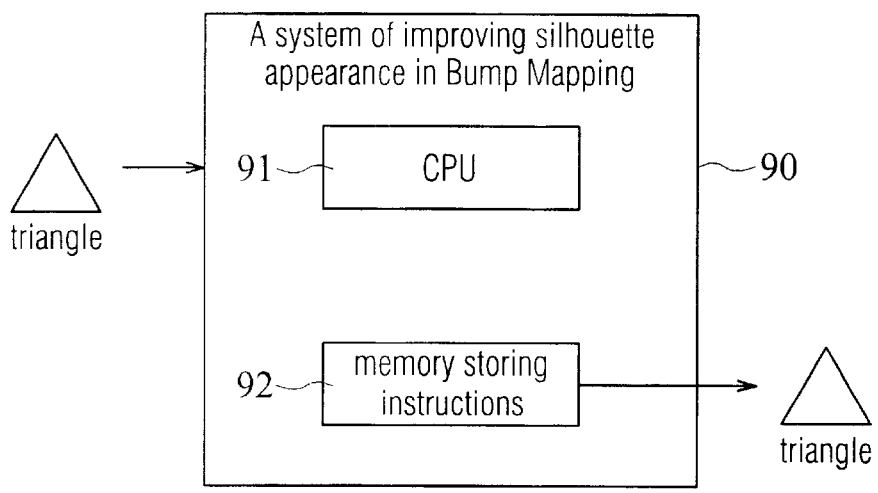
FIG. 9 is also another architectural diagram showing the system of improving silhouette appearance in bump mapping.

Besides, FIG. 9 is another system of improving silhouette appearance in bump mapping, different from the architecture of FIG. 8, includes a CPU 91 and a memory storing instructions 92. CPU 91 can access instructions stored in the memory and execute a method of improving silhouette appearance in bump mapping as described in FIG. 2.

Note that CPU 91 can be any architecture, such as ALU (arithmetic logic unit) for mathematic and logic operations, registers for storing data or instructions temporarily and control units for controlling all operations of computers. Memory storing instructions 92 can be any computer-readable memory that can store data, such as dynamic random access memory (DRAM), read only memory (ROM), electrically erasable programmable read-only memory or the combination.

The above-described embodiment should be considered in all respects as illustrative and not restrictive. Any modifications and changes made to the invention should be included in the appended claims without departing from the spirit and scope of the invention as set forth in the appended claims.

What is claimed is:

1. A method of improving silhouette appearance in bump mapping comprising:

a receiving step of receiving a triangle of a plurality of triangles;

a checking vertex step of checking whether there is a vertex near silhouette in the triangle;

a checking subdivision step of checking whether the triangle meets a predetermined criterion of subdivision if the result of the checking vertex step is "YES";

a subdividing step of subdividing the triangle if the result of the checking subdivision step is "YES";

a repeating step of repeating the receiving step, the checking vertex step, the checking subdivision step and the subdividing step until the triangle does not meet the predetermined criterion;

a displacing step of displacing the vertex positions near silhouette along their normals according to the displacements obtained from displacement mapping if the result of the checking subdivision step is "NO"; and a bump mapping step of implementing bump mapping if the result of the checking vertex step is "NO".

2. The method of claim 1, wherein, in the checking vertex step, the vertex is checked to be near silhouette if $0 \leq |\vec{N} \bullet \vec{V}| \leq d$ is satisfied, wherein d is a user-defined constant, which is a positive real number and satisfies $0 \leq d \leq 1$, $\vec{N}$ is a vertex normal of the vertex and also an average normal of surface normals of all triangles adjacent to the vertex, $\vec{V}$ is a vector pointing in a direction from a vertex point to an eye position, and both $\vec{N}$ and $\vec{V}$ are normalized.

3. The method of claim 1, wherein the predetermined criterion in the checking subdivision step is that the number of subdivision is less than a constant.

4. The method of claim 1, wherein the predetermined criterion in the checking subdivision step is that each of subdivided area is larger than or equal to a constant.

5. The method of claim 1, wherein the subdividing step comprises:

forming four triangles by interconnecting middle points of three sides of the triangle; and calculating three new vertex normals at middle points by using interpolation.

6. A system of improving silhouette appearance in bump mapping comprising:

a receiving device for receiving a triangle of a plurality of triangles;

a checking vertex device for checking whether there is a vertex near silhouette in the triangle;

a checking subdivision device for checking whether the triangle meets a predetermined criterion of subdivision if there is a vertex near silhouette in the triangle;

a subdividing device for subdividing the triangle;

a repeating device for conducting the receiving device, the checking vertex device, the checking subdivision device and the subdividing device to repeat their own operations until the triangle does not meet the predetermined criterion, and then inputting the triangle into the displacing device;

a displacing device of displacing the vertex positions near silhouette along their normals according to the displacements obtained from displacement mapping; and a bump mapping device of implementing bump mapping if there is no vertex near silhouette in the triangle or after the triangle has been processed by the displacing device.

7. The system of claim 6, wherein in the checking vertex device, the vertex is checked to be near sihouette if $0 \leq |\vec{N} \bullet \vec{V}| \leq d$ is satisfied, wherein d is a user-defined constant, which is a positive real number and satisfies $0 \leq d \leq 1$, $\vec{N}$ is a vertex normal of the vertex and also an average normal of surface normals of all triangles adjacent to the vertex, $\vec{V}$ is a vector pointing in a direction from a vertex point to an eye position, and both $\vec{N}$ and $\vec{V}$ are normalized.

8. The system of claim 6, wherein the predetermined criterion in the checking subdivision device is that the number of subdivision is less than a constant.

9. The system of claim 6, wherein the predetermined criterion in the checking subdivision device is that each of subdivided area is larger than or equal to a constant.

10. The system of claim 6, wherein the subdividing device subdivides the triangle by:

forming four triangles by interconnecting middle points of three sides of the triangle; and calculating three new vertex normals at middle points by using interpolation.

11. A machine-readable record medium storing a program for instructing an MPU (Microprocessor Unit) etc. to execute a method of improving silhouette appearance in bump mapping, the method comprising:

a receiving step of receiving a triangle of a plurality of triangles;

a receiving step of receiving a triangle of a plurality of triangles;

a checking vertex step of checking whether there is a vertex near silhouette in the triangle;

a checking subdivision step of checking whether the triangle meets a predetermined criterion of subdivision if the result of the checking vertex step is "YES";

a subdividing step of subdividing the triangle if the result of the checking subdivision step is "YES";

a repeating step of repeating the receiving step, the checking vertex step, the checking subdivision step and the subdividing step until the triangle does not meet the predetermined criterion;

a displacing step of displacing the vertex positions near silhouette along their normals according to the displacements obtained from displacement mapping if the result of the checking subdivision step is "NO"; and a bump mapping step of implementing bump mapping if the result of the checking vertex step is "NO".

12. The machine-readable record medium as claimed in claim 11, wherein in the checking vertex step, the vertex is checked to be near silhouette if $0 \leq |\vec{N} \bullet \vec{V}| \leq d$ is satisfied, wherein d is a user-defined constant, which is a positive real number and satisfies $0 \leq d \leq 1$, $\vec{N}$ is a vertex normal of the vertex and also an average normal of surface normals of all triangles adjacent to the vertex, $\vec{V}$ is a vector pointing in a direction from a vertex point to an eye position, and both $\vec{N}$ and $\vec{V}$ are normalized.

13. The machine-readable record medium as claimed in claim 11, wherein the predetermined criterion in the checking subdivision step is that the number of subdivision is less than a constant.

14. The machine-readable record medium as claimed in claim 11, wherein the predetermined criterion in the checking subdivision step is that each of subdivided area is larger than or equal to a constant.

15. The machine-readable record medium as claimed in claim 11, wherein the subdividing step comprises:

forming four triangles by interconnecting middle points of three sides of the triangle; and calculating three new vertex normals at middle points by using interpolation.

16. A system of improving silhouette appearance in bump mapping comprising:

a CPU; and a memory storing instructions so that the CPU can access instructions stored in the memory and execute a method of improving silhouette appearance in bump mapping, wherein the method comprising:

a receiving step of receiving a triangle of a plurality of triangles;

a checking vertex step of checking whether there is a vertex near silhouette in the triangle;

a checking subdivision step of checking whether the triangle meets a predetermined criterion of subdivision if the result of the checking vertex step is "YES";

a subdividing step of subdividing the triangle if the result of the checking subdivision step is "YES";

a repeating step of repeating the receiving step, the checking vertex step, the checking subdivision step and the subdividing step until the triangle does not meet the predetermined criterion;

a displacing step of displacing the vertex positions near silhouette along their normals according to the displacements obtained from displacement mapping if the result of the checking subdivision step is "NO"; and a bump mapping step of implementing bump mapping.

17. The system as claimed in claim 16, wherein, in the checking vertex step, the vertex is checked to be near silhouette if $0 \leq |\vec{N} \bullet \vec{V}| \leq d$ is satisfied, wherein d is a user-defined constant, which is a positive real number and satisfies $0 \leq d \leq 1$, $\vec{N}$ is a vertex normal of the vertex and also an average normal of surface normals of all triangles adjacent to the vertex, $\vec{V}$ is a vector pointing in a direction from a vertex point to an eye position, and both $\vec{N}$ and $\vec{V}$ are normalized.

18. The system as claimed in claim 16, wherein the predetermined criterion in the checking subdivision step is that the number of subdivision is less than a constant.

19. The system as claimed in claim 16, wherein the predetermined criterion in the checking subdivision step is that each of subdivided area is larger than or equal to a constant.

20. The system of claim 16, wherein the subdividing step comprises:

forming four triangles by interconnecting middle points of three sides of the triangle; and calculating three new vertex normals at middle points by using interpolation.

* * * * *